(12) United States Patent
Pon et al.

(10) Patent No.: US 6,295,072 B1
(45) Date of Patent: Sep. 25, 2001

(54) METHOD AND APPARATUS FOR RENDERING CUBIC CURVES

(75) Inventors: Hon-Wen Pon; Hsiao-Ching Wu, both of Taipei (TW)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/157,422

(22) Filed: Sep. 21, 1998

(30) Foreign Application Priority Data

Jun. 1, 1998 (JP) ................................................ 10-151104

(51) Int. Cl.[7] .................................................... G06T 11/20
(52) U.S. Cl. ........................................... 345/442; 345/625
(58) Field of Search ..................................... 345/442, 118

(56) References Cited

U.S. PATENT DOCUMENTS

| | | | |
|---|---|---|---|
| 4,631,690 | * 12/1986 | Corthout et al. | 364/518 |
| 5,309,521 | 5/1994 | Matsukawa . | |
| 5,363,479 | 11/1994 | Olynyk . | |
| 5,638,503 | 6/1997 | Hoel . | |
| 5,818,459 | 10/1998 | Kurumida . | |
| 5,995,109 | * 11/1999 | Goel et al. | 345/423 |
| 6,100,894 | * 8/2000 | Goel et al. | 345/423 |

FOREIGN PATENT DOCUMENTS

38239/93 11/1993 (AU) .

* cited by examiner

Primary Examiner—Mark Zimmerman
Assistant Examiner—Lance W. Sealey
(74) Attorney, Agent, or Firm—Wenderoth, Lind & Ponack L.L.P.

(57) ABSTRACT

A method and apparatus used to render cubic curves is disclosed. A cubic Bezier curve is rapidly decomposed into small segments piecewise by using two independent operation units in parallel for processing four control points of the cubic Beizer curve with the assistance of an arbitrator to display the cubic curve on a monitor or output to a printer. A set of control data of the cubic Beizer curve is obtained from an input device and serves as the original input data for a vertical division operation unit and a horizontal extension operation unit that generate four sets of control points in parallel. The arbitrator makes two decisions from the four sets of control points. First, if there are sets of control points meeting the condition of rendering the curve, those sets are transferred to a segment generator to generate points for rendering the curve. Second, it determines which set of control points is the next feedback input data for the parallel horizontal extension operation. Finally, the arbitrator also controls the termination of the rendering process. The method and apparatus are suitable for parallel processing in accordance with the geometrical property of the Bezier curve wit high rate and efficiency of rendering curves.

4 Claims, 12 Drawing Sheets

METHOD AND APPARATUS FOR RENDERING CUBIC CURVES

FIELD OF THE INVENTION

The present invention relates to a method and apparatus for rendering cubic curves, and more particularly, to a method and apparatus used to render cubic Bezier curves which are rapidly decomposed into a plurality of small segments piecewise by two independent operation units that process in parallel the input data of four control points of the cubic Bezier curve with the assistance of an arbitrator to display on a monitor or output to a printer.

BACKGROUND OF THE INVENTION

It is usually necessary to render cubic curves in computer aided design or in the field of computer graphics for displaying characters which are an outline font. The approximate approach of the Bezier curve for the cubic curve is one of the methods most widely used.

There are two primary methods for generating Bezier curves in a computer system. The first is the method of Adaptive Subdivision and the second is the method of Forward Difference.

As shown in "A Theoretical Development for the Computer Generation and Display of Piecewise Polynomial Surfaces" IEEE Transactions on Pattern Analysis and Machine Intelligence, Jan. 1980, the principle of Adaptive Subdivision for Bezier curve is as follows:

$$B_n[P; u] = \sum_{i=0}^{n} P_i \binom{n}{i} u^i (1-u)^{n-i}, \text{ we can infer}$$

$$B_n[P; u] = B_n[P_0^0, P_1^1, \ldots, P_n^n; 2u] \quad (I)$$

$$B_n[P; u] = B_n[P_n^n, P_n^{n-1}, \ldots, P_n^0; 2u-1] \quad (II)$$

where, $P_i^k = \begin{cases} (P_{i-1}^{k-1} + P_i^{k-1})/2, & k = 1, 2, \ldots, n \\ P_i & k = 0 \end{cases}$ With reference to FIG. 2, there are four original control points $P_{00}$, $P_{01}$, $P_{02}$, and $P_{03}$, from which three corresponding middle points $P_{11}$, $P_{12}$, and $P_{13}$ are derived. Subsequently, two middle points $P_{22}$ and $P_{23}$ with respect to the above three middle points are obtained. Finally, the middle point $P_{33}$ of the points $P_{22}$ and $P_{23}$ is the point where the parameter u in the above equations is equal to 0.5. From the set of the control points $P_{00}$, $P_{11}$, $P_{22}$, and $P_{33}$ and the set of the control points $P_{33}$, $P_{23}$, $P_{13}$, and $P_{03}$, the first and second half segments of the original curve can be generated, respectively. If the space of the parameter u ranges from 0.0 to 1.0, the first half segment is related to the parameter u from 0.0 to 0.5 and the second half segment is related to the parameter u from 0.5 to 1.0.

If the two new sets of control points continue to be divided, many new control points with equal space can be obtained. According to the absolute convergence of the Bezier curve, the new control points can be further approximate to the original curve as the division segment becomes much smaller.

The binary approximation algorithm is most well illustrated by a binary tree as shown in FIG. 3. A primary set of control points C which consists of four control points may generate two subsets of control points LC and RC, which may further generate LLC, RLC, LRC, and RRC as the final output in the binary tree. Thus, the above Adaptive Subdivision is very close to the method of Depth-First Transversal in the conventional binary tree. The data in the right subset of control points are stored in a stack memory and the left subset of control points are used as the source data for the next division when the present division process is finished. If the subset of control points to be divided meets the requirement of convergence, i.e., the four control points of the subset are in the same straight line, the subset is used to render a curve and stops being further divided and the right subset, previously pushed into the stack memory, is used as the source data for the next division process. The above-mentioned process is repeated until there is no available data.

The method of Adaptive Subdivision has four advantages. First, the input and output data are consistent in format, i.e., both the source and output data are control points. If there are multiple Bezier generators, the desired curve can be implemented in parallel by suitable series connection. Second, only a simple operation using an adder and a shifter is needed and can be implemented easily by a hardware circuit or a microprogram. Third, according to the convergence condition for determining which level of division is necessary, good output data can be derived from any curve with rigorous variation. Fourth, if the curve crosses over the visible window, the top-down division process can screen those unnecessary operations out of the visible window.

However, the method of Adaptive Subdivision has some disadvantages. First, it is necessary to have one set of rapid stack memory used to temporarily store the control points and to pull out the stored data. Second, every node in the binary tree has to be processed while using the binary tree to perform track operation. However, only the final node is needed and those operations for the middle points are unnecessary.

With regard to Forward Difference, the principle of difference is used. Define the forward difference as $\Delta f(t) = f(t+\delta) - f(t)$, where $\delta > 0$. When $f_n = f(t_n)$ and $t_n = n \cdot \delta$, $f_{n+1} = f_n + \Delta f_n$. In addition, $\Delta f_{n+1} = \Delta f_n + \Delta^2 f_n$, $\Delta^2 f_{n+1} = \Delta^2 f_n + \Delta^3 f_n$. Assuming a polynomial $f(t) = a + bt + ct^2 + dt^3$, $$\Delta f(t) = 3dt^2\delta + t(3d\delta^2 + 2c\delta) + d\delta^3 + c\delta^2 + b\delta.$$

$$\Delta^2 f(t) = \Delta(\Delta f(t)) = 6\delta d^2 t + 6d\delta^3 + 2c\delta^2.$$

$$\Delta^3 f(t) = \Delta(\Delta^2 f(t)) = 6d\delta^3.$$

We can calculate the initial condition: $f_0 = a$, $\Delta f_0 = d\delta^3 + c\delta^2 + b\delta$, $\Delta^2 f_0 = 6d\delta^3 + 2c\delta^2$, $\Delta^3 f_0 = 6d\delta^3$. Subsequent data can be derived as follows:

$$f_{i+1} = f_i + \Delta f_i, \, \Delta f_{i+1} = \Delta f_i + \Delta^2 f_i, \, \Delta^2 f_{i+1} = \Delta^2 f_i + \Delta^3 f_0.$$

The method of Forward Difference has two advantages. First, only one step is required to rapidly generate desired points for rendering a curve by using three adders. Second, not only Bezier curves, but also any type of cubic curves can be rendered.

The method of Forward Difference still has three disadvantages. First, it is necessary to transform the Bezier curve with the geometrical parameter into a cubic polynomial by a pre-process of floating point multiplication. Second, the value of difference has to be fixed and is very difficult to determine, especially where the curvature varies so significantly that good output data are hard to obtain. This is the most serious disadvantage. Third, although the present part of computation is out of the visible window, it is still necessary to perform the computation because the computation has to be accomplished point by point.

To solve the above disadvantages, a paper titled "Adaptive Forward Differencing for Rendering Curves and Surfaces" Computer Graphics, July 1987, provides a modified method of Adaptive Forward Difference (AFD). First, the Bezier curve which takes control points as the parameters is transformed into a polynomial based on AFD as follows:

f(t)=a_0A_0(t)+a_1A_1(t)+a_2A_2(t)+a_3A_3(t), where $A_k(t)=((t-k+1)/k)*A_{k-1}$ and $A_0(t)=1$. That is, when t=0, the basis of AFD comprises: $A_0(t)=1$, $A_1(t)=t$, $A_2(t)=(1/2)(t)(t-1)$, and $A_3(t)=(1/6)(t)(t-1)(t-2)$. When t=t+1, the basis of AFD comprises: $A_0(t+1)=1=A_0(t)$, $A_1(t+1)=A_0(t)+A_1(t)$, $A_2(t+1)=A_1(t)+A_2(t)$, and $A_3(t+1)=A_2(t)+A3(t)$.

The new basis is brought into the polynomial to obtain:

f(t+1)=(a_0+a_1)A_0(t)+(a_1+a_2)A_1(t)+(a_2+a_3)A_2(t)+a_3A_3(t), which illustrates the relation with the old basis.

Therefore, E, L, R, and P represent the operation matrices of the AFD basis matrix A=[A_0(t),A_1(t),A_2(t),A_3(t)]

with respect to f(t+1), f(t/2), f(t/2+1), and f(2t), respectively, where $$E = \begin{bmatrix} 1 & 1 & 0 & 0 \\ 0 & 1 & 1 & 0 \\ 0 & 0 & 1 & 1 \\ 0 & 0 & 0 & 1 \end{bmatrix}$$

$$L = \begin{bmatrix} 1 & 1 & 0 & 0 \\ 0 & 1/2 & -1/8 & 1/16 \\ 0 & 0 & 1/4 & -1/8 \\ 0 & 0 & 0 & 1/8 \end{bmatrix}$$

$$R = \begin{bmatrix} 1 & 1 & 0 & 0 \\ 0 & 1/2 & 3/8 & -1/16 \\ 0 & 0 & 1/4 & -1/8 \\ 0 & 0 & 0 & 1/8 \end{bmatrix}$$

$$P = \begin{bmatrix} 1 & 0 & 0 & 0 \\ 0 & 2 & 1 & 0 \\ 0 & 0 & 4 & 4 \\ 0 & 0 & 0 & 8 \end{bmatrix}$$

Theoretically, the method of Adaptive Forward Difference has the advantage of rapid operation in Forward Difference and can also be adapted to the division level in each step. With reference to FIG. 4, as an example, Adaptive Forward Difference does not only have L and R operations as in Adaptive Subdivision or only E operation as in Forward Difference, but has four operations of L, R, E, and P.

However, the method of determining the division level is arguable because it is not rigorous enough to determine the convergence from the distance between the present and the previous points. With reference to FIG. 5, the distance between the first point $P_0$ and the last point $P_3$ is zero, but the curve is not convergent. Thus, the speed of rendering curves is fast if the condition of convergence is loose, but the speed will become slow and it becomes a bottleneck if the condition is too rigorous.

In summary, the methods of Adaptive Subdivision and Adaptive Forward Difference in the prior arts have disadvantages as follows:

(1) Adaptive Subdivision needs a stack memory device such that the efficiency of system operation is greatly reduced due to the large amount of processing in stack access; and the performance of division is also poor.

(2) Adaptive Forward Difference needs to transform the parametric formula of a Bezier curve into a AFD basis formula, which takes substantial time to perform the floating point operation.

(3) The output of Adaptive Forward Difference is in a format of points instead of a set of control points such that many properties of Bezier curve are not available. For example, the property of convex hull for a Bezier curve is used to determine if the curve is out of the visible window and to rapidly skip the unnecessary computation. Furthermore, the tangential line of the curve can be determined by control points. It is greatly desired information for a shading process in computing an angle between a light source and an object.

SUMMARY OF THE INVENTION

The object of the present invention is to provide a method of rendering cubic curves in a computer system consisting of a memory device, a display device, and an input device such as a keyboard or mouse to overcome the above problems. The method comprises:

step 1 (Input): a control point set containing four control points in a Bezier curve is entered by a user;

step 2 (Vertical division): the control point set is divided into two sets of control points, including left and right child sets of control points;

step 3 (Horizontal extension): adjacent and parent sets of the control point set are derived from the four control points by an appropriate algorithm;

step 4 (Output): if the sets of control points meet a convergence condition of a straight line, the first and last points are used as terminal points to display on a monitor or output to a printer;

step 5 (Path selection): in principle, the adjacent set is used as the source data for the next process; if the control point set is convergent, the parent set is selected as the source data for the next process; if one of the child sets is convergent, the child set is selected as the source data for the next process; and step 6 (Termination): check if a desired cubic curve is finished, return to step 2 if not finished.

Another objective of the present invention is to provide an apparatus for rendering cubic curves in a computer system which contains a memory device, a display device, and an input device such as a keyboard or mouse, comprising:

a visible window coordinate register, which is used to store coordinates of upper-left and lower-right locations in a visible window to serve as a reference for determining if a curve is visible;

an input control point register, storing input control points;

an output control point register, storing output control points;

an LR operator, generating left and right child sets of control points in parallel with three layers of operation by means of a simple operation of addition and shift;

an EP operator, generating an adjacent set and a parent set of control points in parallel with three layers of operation by means of a simple process of addition and shift;

a path selector, which contains a convergence analyzer, a visibility determining device, and a termination counter, determining feedback inputs and outputs from control points derived from the LR and EP operators; and a segment generator, generating point data in a desired line with the first and the last control points of a Bezier curve as terminal points in accordance with a driver of the display device.

The user may input control point data of the Bezier curve into the input control point register and the visible window coordinate register and trigger other parts of the apparatus in the present invention. The right, left, adjacent, and parent control points can be obtained from any set of control points by the LR and EP operators. The path selector checks the convergence of the four points and the relation with the visible window to determine the feedback input for the next operation. Under optimal condition, the parent control point is not convergent and the left and right control points are convergent. Then, the left and right control points are directly transferred to the output control point register. After the output control point register receives the effective control points, these data are transferred to the segment generator which will generate point data for the desired segment by means of a conventional Digital Differential Analyzer (DDA) with the first and the last points as the start and end points, respectively. The conventional Adaptive Subdivision will stop the rendering operation if the stack is empty. The present invention needs to design a termination counter such that the value in the counter is adapted with respect to the path selector and the rendering operation will stop when the value in the counter is less than zero.

Other features and advantages of the present invention will become apparent after the following description which refers to the accompanying drawings.

DETAILED DESCRIPTION OF THE PREFERRED EMBODIMENTS

Figure 1:
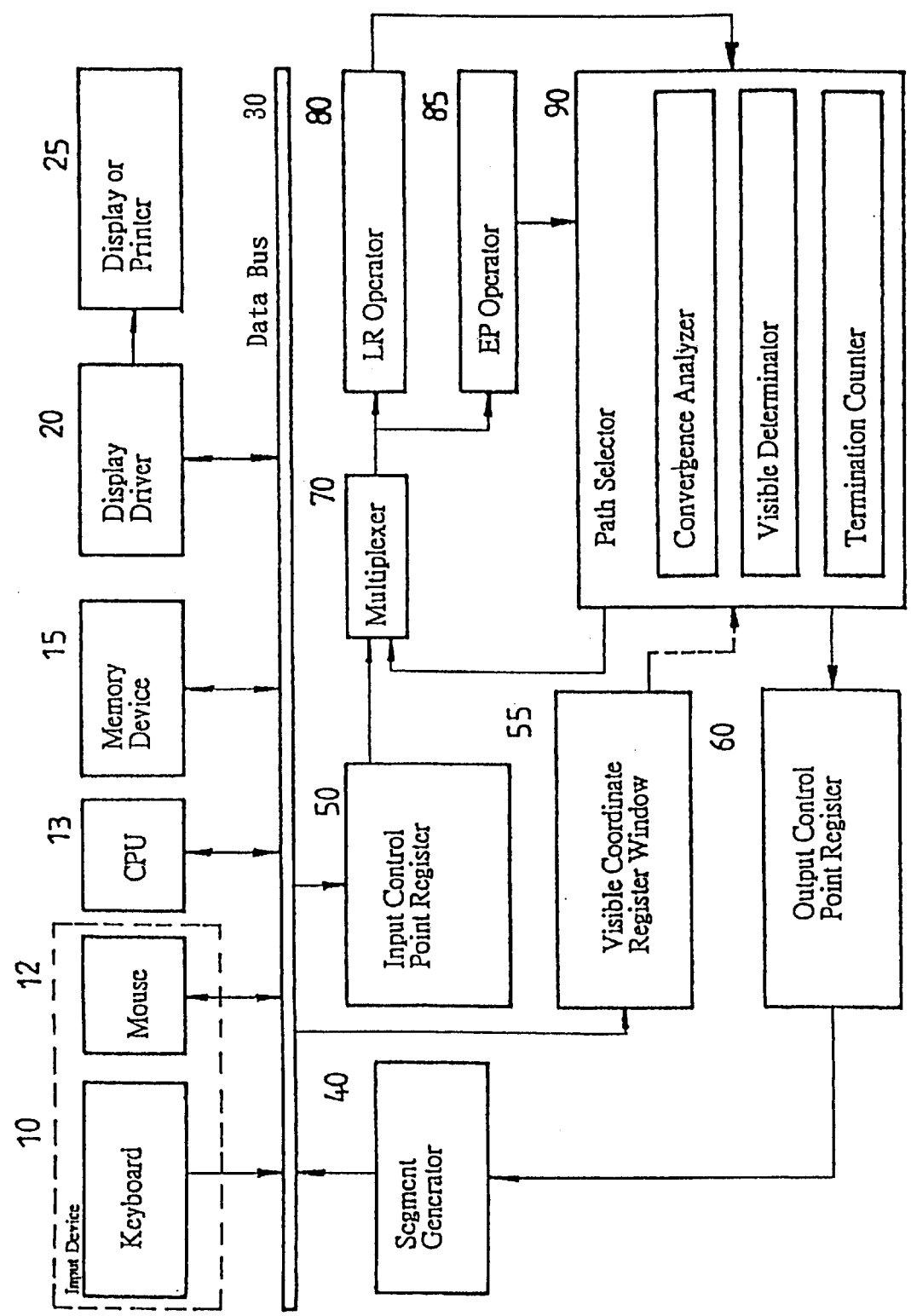
FIG. 1 shows a system block diagram of a preferred embodiment in the present invention.
Figure 2:
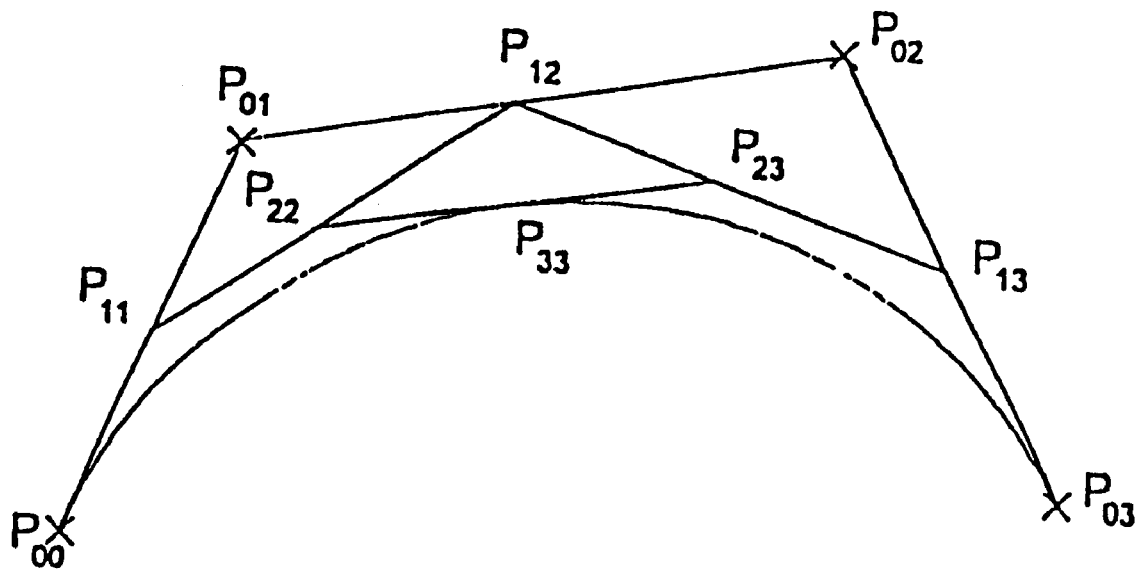
FIG. 2 shows a schematic diagram illustrating the division principle of a Bezier curve.
Figure 3:
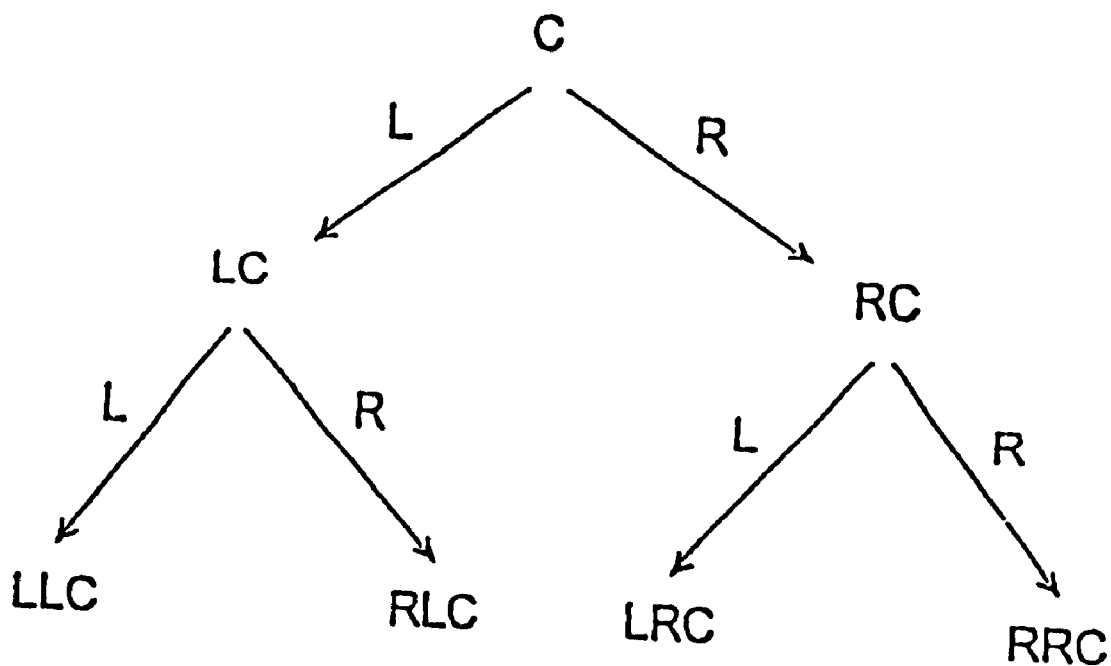
FIG. 3 shows a binary tree structure illustrating an LR operation of an iterative division.
Figure 4:
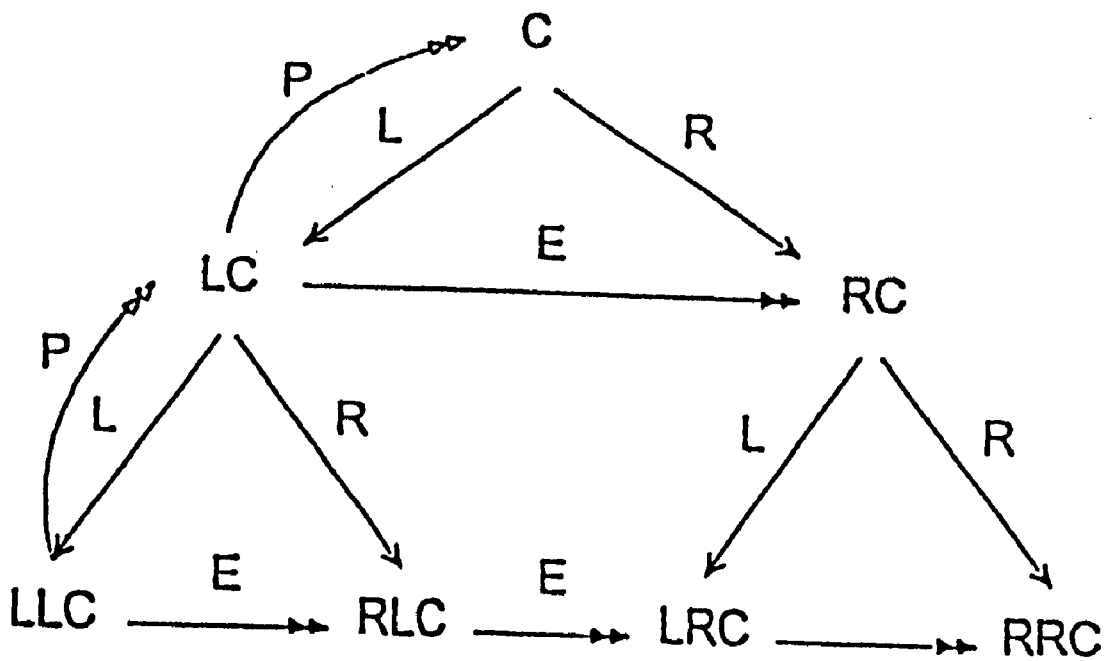
FIG. 4 shows L, R, E, and P operations of adaptive forward difference by a binary tree structure.
Figure 5:
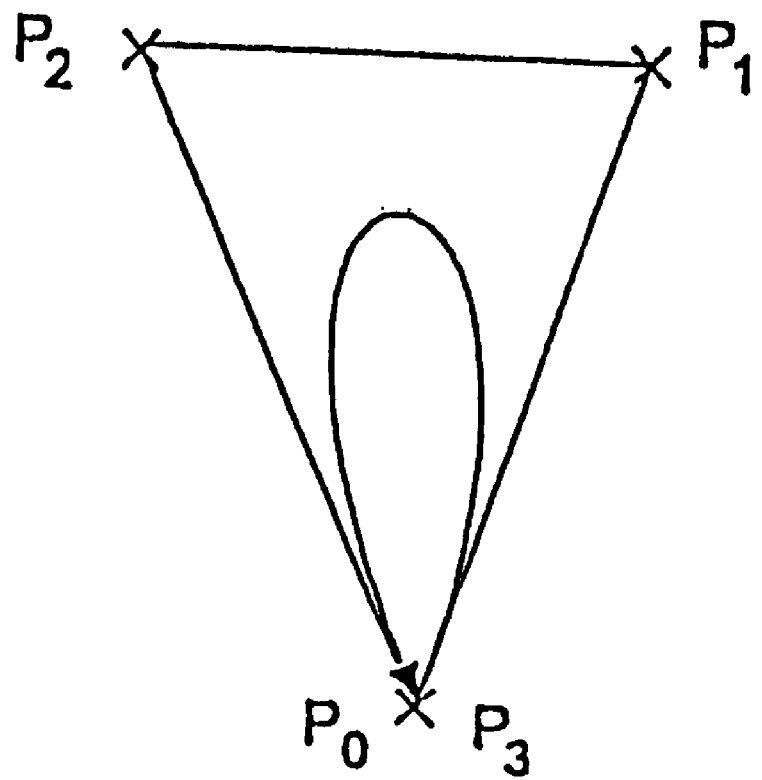
FIG. 5 illustrates a special case of a Bezier curve.
Figure 6:
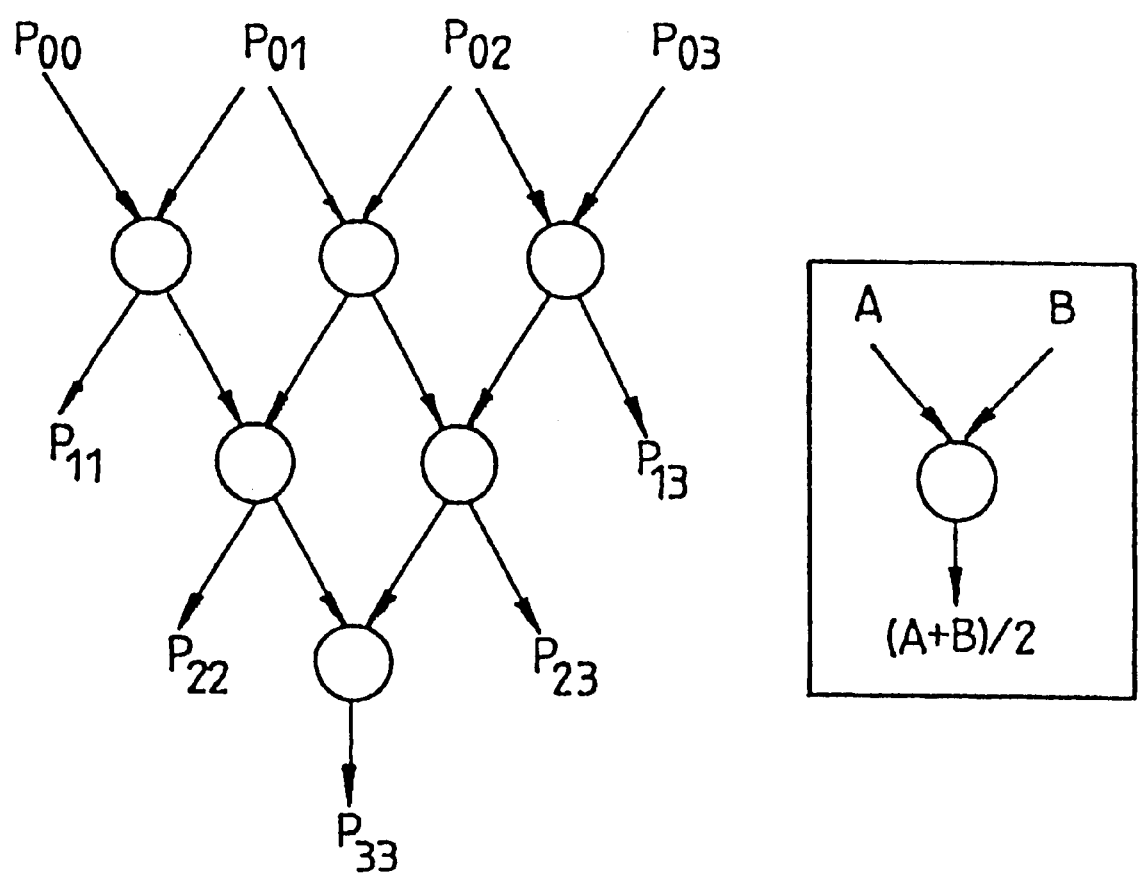
FIG. 6 shows the internal structure of the LR operator of the preferred embodiment in the present invention.
Figure 7:
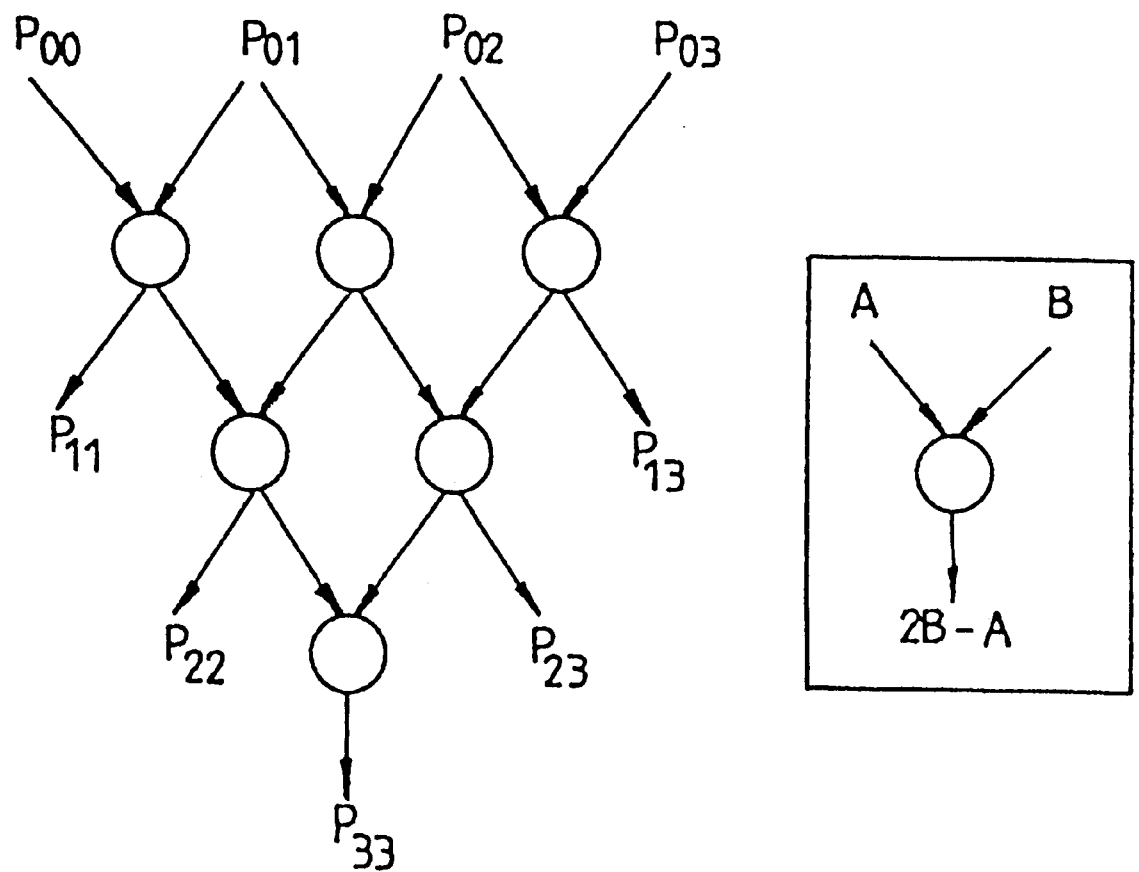
FIG. 7 shows the internal structure of the EP operator of the preferred embodiment in the present invention.
Figure 8:
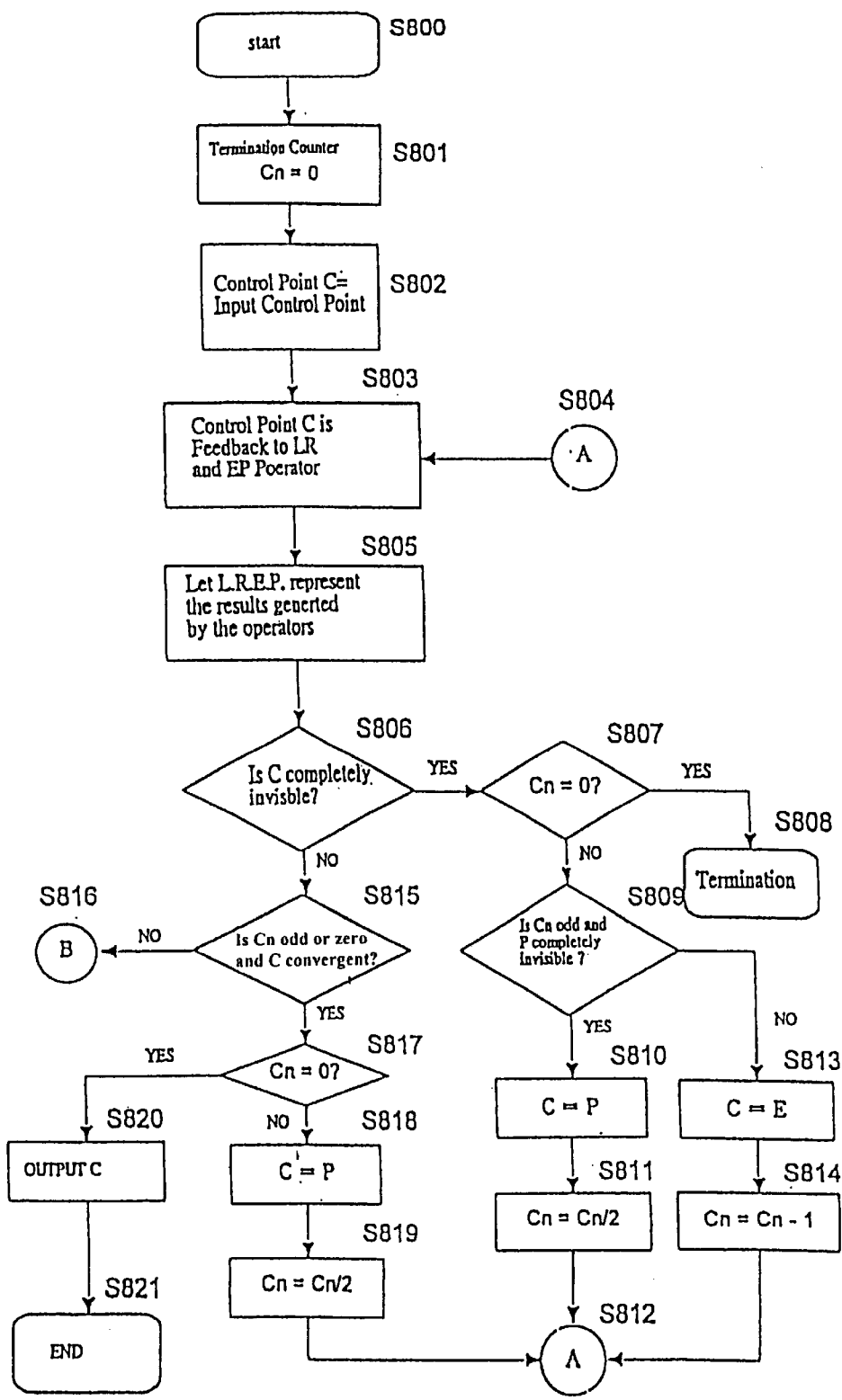
FIG. 8 shows a flowchart of a path selector of the preferred embodiment in the present invention.
Figure 8:
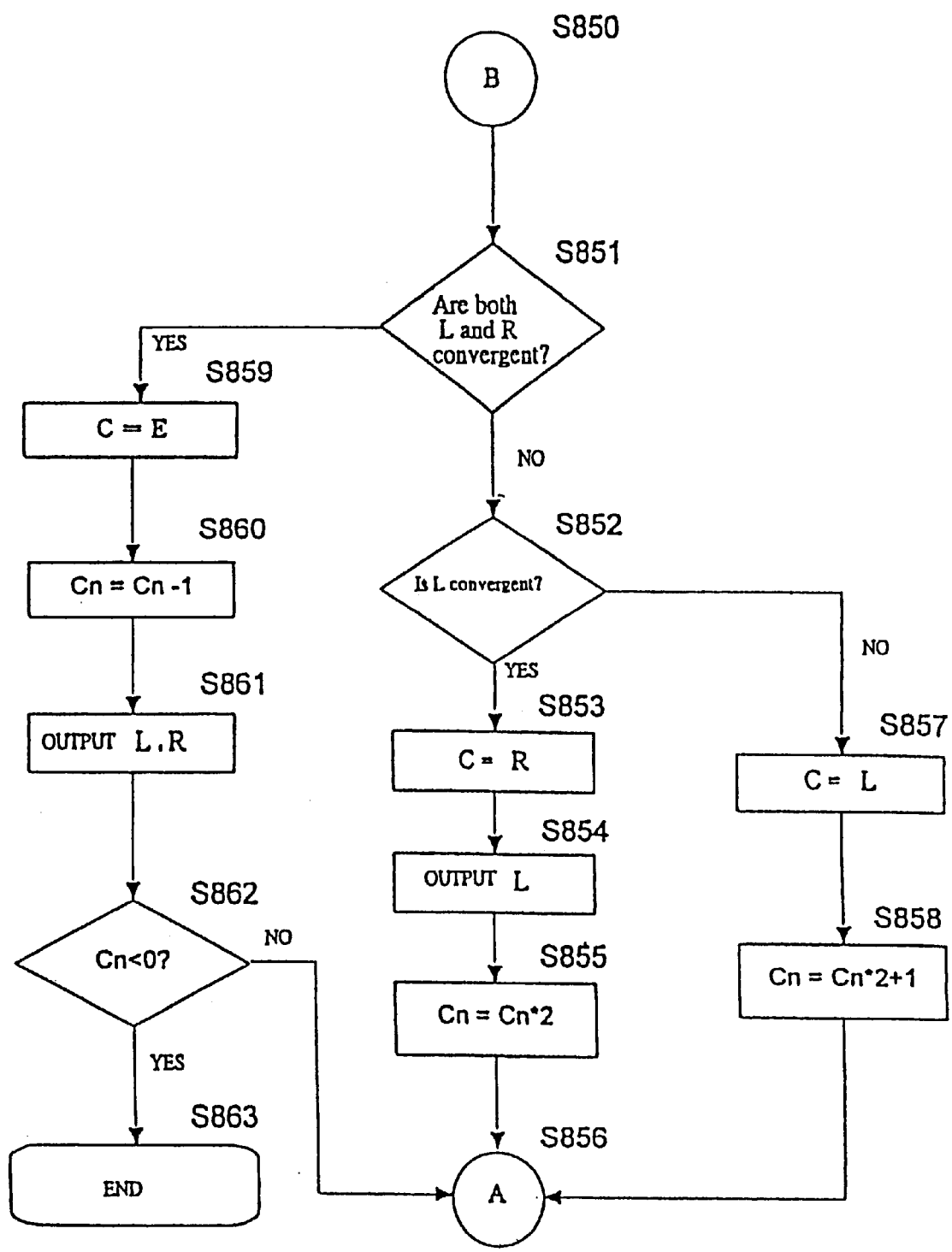

With reference to FIG. 1, the system block diagram includes a keyboard 10 and a mouse 12 as an input device for a user to input control point data of a curve, and a memory device 15 to store the coordinate data from the input device. Moreover, a CPU (Central Processing Unit) 13 is used to transfer coordinate data of a visible window and the control points stored in the memory device 15 to a data bus 30. A visible window coordinate register 55 and an input control point register 50 receive the above coordinate and control point data, respectively. Once the control point data are entered into the input control point register 50, the generation process for a Bezier curve is triggered. An LR operator 80 is used to transform the set of input control point data into left and right child sets of control points in parallel as shown in FIG. 6, which illustrates the internal construction. An EP operator 85 is used to transform the input control points into adjacent and parent sets of control points in parallel as shown in FIG. 7, illustrating the internal construction. A path selector 90 is used to analyze the control point data from the LR and EP operators in order to determine whether to generate output data or not, how to feedback, and the final termination, as shown in FIG. 8 which illustrates the flowchart of the control process. A multiplexer 70 controls the input sources of the two operators such that the LR and EP operators will only receive the feedback data from the path selector 90, except that the first input data are from the input control point register 50. An output control point register 60 stores the output data of the curve. A segment generator 40 further deals with the output data and simulates the Bezier curve in a manner of a straight line, which is divided and convergent to a line. A display driver 20 and a display device 25 are used to display the final result in accordance with the segment generator 40.

The flowchart of the path selector is shown in FIG. 8. The termination counter is reset to zero in Step S801. Step S802 obtains a first set of input data for operation in accordance with the data stored in the input control point register 50. In step S805, the input C is transferred to the LR and EP operators to obtain four sets of L, R, E, and P, which are the selected control points as the next feedback input data with the priority order as P, L, R, and E. At this time, step S806 checks if the input C is completely out of the visible window. If yes, step S807 checks the termination condition (the value in the termination counter is 0) and if it is met, all of the operations in progress will stop. If the input C is completely out of the visible window, but the termination condition is not met, there are two results to sustain the intact binary tree construction. Assume that a parent set of control points has been used as control points under processing. First, if the present control point set is the left child set of the parent set and the set P of the parent set is also out of the visible window, the present control point data C is replaced by the set P of the parent set in step S810, and the value in the termination counter is subsequently divided by 2 in step S811. Second, if step S809 acquires that the present control point set is the right child set of the parent set of control points or the set P is not completely out of the visible window, the adjacent set of control point E takes the place of C in step S813 and step S814 decreases the value in the termination counter by 1. Then, the next operation is proceeded by returning back to step S803, via steps S812 and S804.

If there is at least part of the set of control points C within the visible window, step S815 checks if the set C is convergent and is the left subset of the parent set. If yes, the operation moves toward the parent set. Steps S818 and S819 illustrate the forward process. If the set C is the last, step S820 outputs the set C and terminates all of the operations in progress.

After step S850, step S851 is used to check L and R and there are three cases. First, if the sets L and R are convergent, the adjacent set of control points E will be used in place of the present set of control points C in step S859 and the value in the termination counter will be reduced by 1 in step S860. Step S861 outputs the sets L and R in parallel. Second, if the set L is convergent but the set R is not, the set of control points R will be used in place of the present set C in step S853. Step S854 outputs the set L and step S855 multiplies the value of the counter by 2. Third, if the set L is not convergent, the set L is used in place of the present set C in step S857 and step S858 multiplies the value of the counter by 2 and then adds 1.

Figure 9:
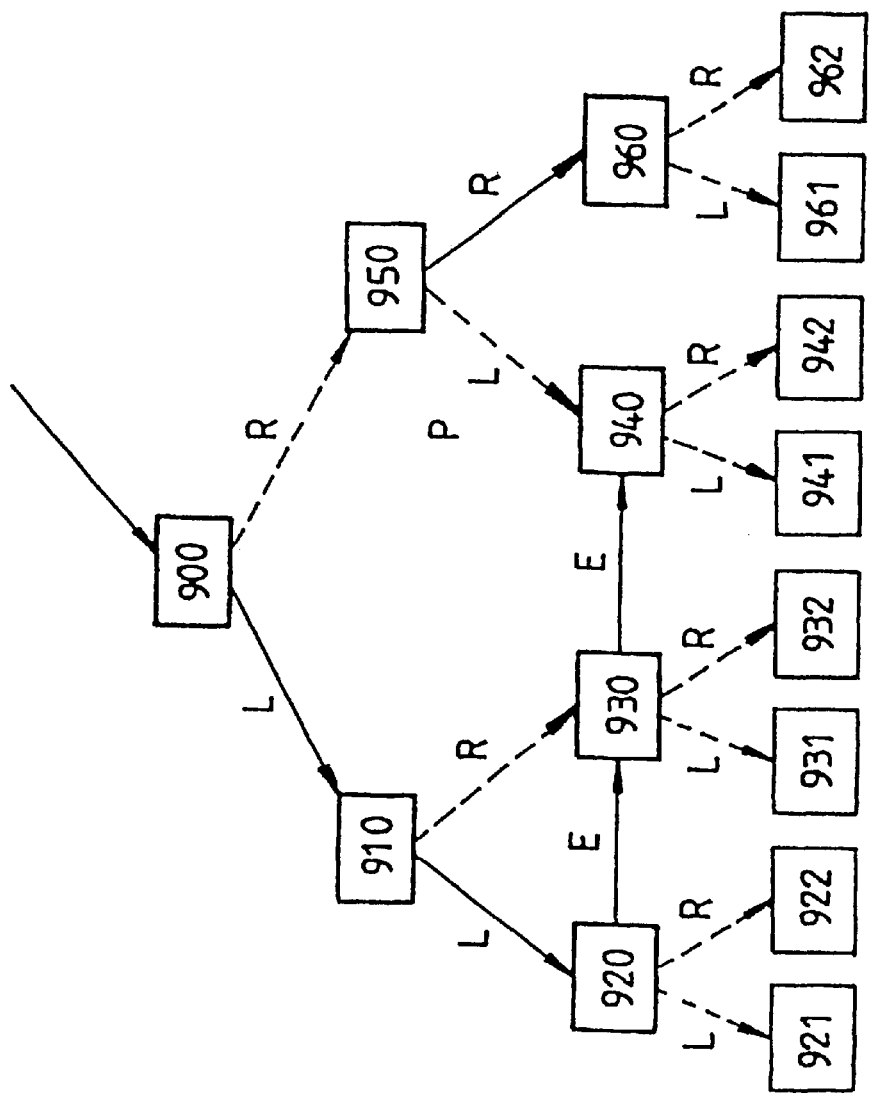
FIG. 9 illustrates a simulation of the path selector of the preferred embodiment in the present invention.

FIG. 9 is used to illustrate the simulation of path selection in which each process of rendering a curve responds to a binary tree structure. In FIG. 9, the order of the division operation for the operator LR is node 900, node 910, and node 920. The system will output the data of 921 and 922 and go towards node 930 because the control points with respect to nodes 921 and 922 derived from node 920 are convergent. The system will output the data of 931 and 932 and go towards node 940 because the control points with respect to nodes 931 and 932 derived from node 930 are convergent. However, the control points for node 940 are convergent and then the system will further go towards node 950. From the viewpoint of node 950, the control points of node 940 are convergent and the system outputs the data for node 940, but node 960 is not convergent such that the system will go further toward node 960. Because node 961 and node 962 are convergent, the system will screen out the control point data of nodes 961 and 962.

The above-mentioned illustrates the flowchart and the result of simulation. Four points will be described in detail: first, the internal construction and operation of the operators LR and EP; second, how to determine the convergence of the control points; third, how to determine if the curve is within the visible window; fourth, the efficiency of the apparatus in the present invention for rendering cubic curves.

1. The internal construction and operation for the operators LR and EP. The LR operator uses the design of the conventional Adaptive Subdivision method as shown in FIG. 6. Each small circle represents an operation unit generating (A+B)/2, where A and B are two input data. After three operations, the original control points ($P_{00}$, $P_{01}$, $P_{02}$, and $P_{03}$) are divided into a left child set ($P_{00}$, $P_{11}$, $P_{22}$, and $P_{33}$) and a right child set $P_{33}$, $P_{23}$, $P_{13}$, and $P_{03}$).

The EP operator is provided in the present invention, which is similar to the LR operator as shown in FIG. 7. Each small circle represents an operation unit generating 2B-A, where A and B are two input data. After three operations, the original control points ($P_{00}$, $P_{01}$, $P_{02}$, and $P_{03}$) are divided into a parent set ($P_{00}$, $P_{11}$, $P_{22}$, and $P_{33}$) and an adjacent set ($P_{03}$, $P_{13}$, $P_{23}$, and $P_{33}$).

As is well-known, the division process of the LR operator for a Bezier curve is as follows.

$$\text{Assume } B_n[P; u] = \sum_{i=0}^{n} P_i \binom{n}{i} u^i (1-u)^{n-i}, \text{ then}$$

$$B_n[P; u] = B_n[P_0^0, P_1^1, \ldots, P_n^n; 2u] \qquad (I)$$

$$B_n[P; u] = B_n[P_n^n, P_n^{n-1}, \ldots, P_n^0; 2u - 1] \qquad (II)$$

$$\text{where, } P_i^k = \begin{cases} (P_{i-1}^{k-1} + P_i^{k-1})/2, & k = 1, 2, \ldots, n \\ P_i & k = 0 \end{cases}$$

The present invention provides the following algorithm for the EP operator (it can be proven by inductive method):

$$\text{Assume } B_n[P; u] = \sum_{i=0}^{n} P_i \binom{n}{i} u^i (1-u)^{n-i}, \text{ then}$$

$$B_n[P; u] = B_n[P_0^0, P_1^1, \ldots, P_n^n; 2u] \qquad (I)$$

$$B_n[P; u] = B_n[P_n^n, P_n^{n-1}, \ldots, P_n^0; 2u - 1] \qquad (II)$$

$$\text{where, } P_i^k = \begin{cases} (P_{i-1}^{k-1} + P_i^{k-1})/2, & k = 1, 2, \ldots, n \\ P_i & k = 0 \end{cases}$$

The present invention can generate not only cubic curves, but also square curves or more high level curves. Moreover, to explain the present invention more clearly, both FIGS. 6 and 7 use 6 operators. If it is desired to implement the operations by hardware circuit, the number of operators can be reduced to 3 by adding suitable feedback circuits.

Figure 10:
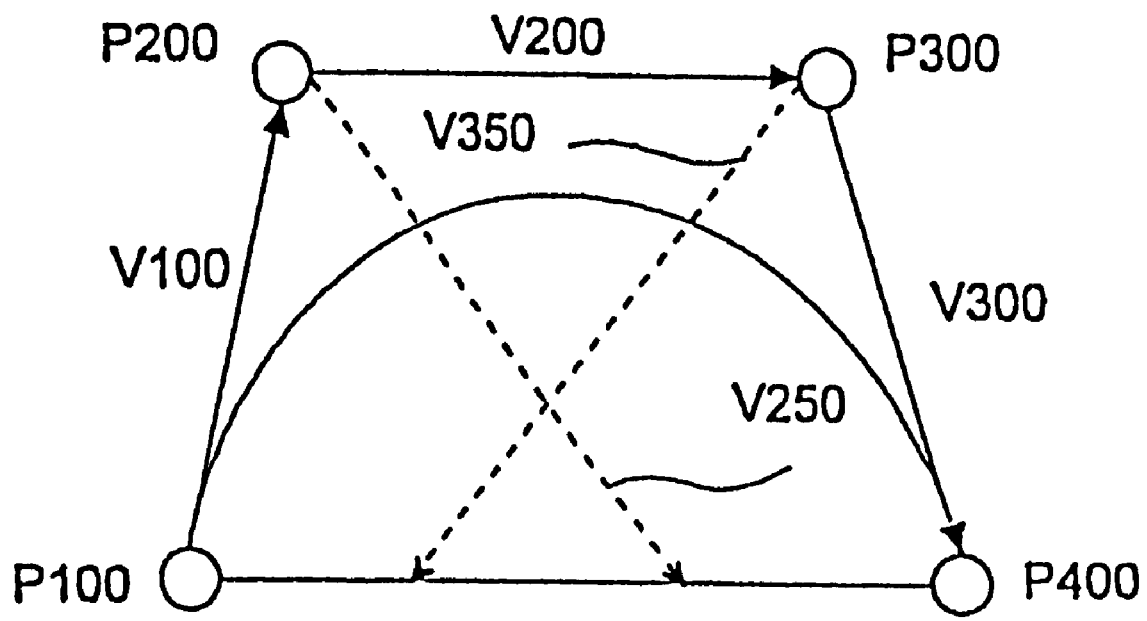
FIG. 10 illustrates the process of determining the convergence of control points of the preferred embodiment in the present invention.

2. How to determine the convergence of the control points. As shown in FIG. 10, to determine that the Bezier curve defined by the set C (P100, P200, P300, and P400) is convergent to a line, the conventional method makes two lines from P200 and P300, respectively, which are vertical to the segment between P100 and P400. If the length of the two segments are smaller than a threshold value, the control points are taken as convergent.

A simpler method as follows is usually used to save computation time or for convenience of implementing a hardware circuit. In this simpler method, only two vectors V250 (V200 subtracts V100) and V350 (V300 subtracts V200) are calculated and if the X or Y components of the two vectors are smaller than the threshold value, the control points are taken as convergent.

3. How to determine if the curve is within the visible window. The advantage of the present invention over Forward Difference is that it is much easier to determine if the present control points are out of the visible window and adapt the level of division in a dynamic manner.

Figure 11:
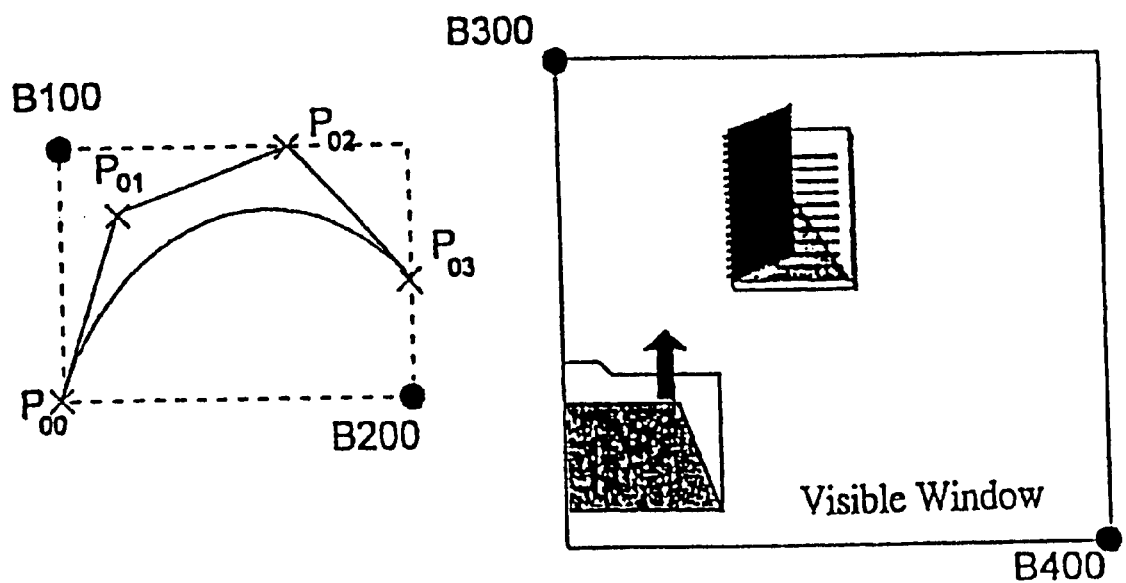
FIG. 11 illustrates an acquisition process in a visible window of the preferred embodiment in the present invention.

In FIG. 11, the Bezier curve defined by the control points ($P_{00}$, $P_{01}$, $P_{02}$, and $P_{03}$) is completely out of the visible window which is defined by (B300, B400). It is easy to determine the curve is out of the window if the maximal coordinate values of the four control points are obtained.

4. The efficiency of the apparatus in the present invention for rendering cubic curves. The advantages over the conventional method of Adaptive Subdivision are: first, a memory stack is no longer needed, which saves access time; and second, two terminal nodes in the binary tree have to be processed instead of all nodes in Adaptive Subdivision. For an intact binary tree, if the number of the terminal nodes is N, there are 2N-1 nodes total.

There are three advantages over the method of Adaptive Forward Difference. First, Adaptive Forward Difference needs floating point operations such as multiplication and division to transform the Bezier curve based on control points to be AFD based. Second, Adaptive Forward Difference can not skip unnecessary computations in the case that the curve is outside of the visible window. Third, the present invention needs only 12 addition and subtraction processes (36 clocks) and 12 shift processes (42 clocks) in an Intel 8086 processor to implement L, R, E, and P operations, but Adaptive Forward Difference needs 14 addition and subtraction processes (42 clocks) and 41 shift processes (82 clocks).

There are three primary advantages of the present invention:

(1) a memory stack device is not needed and as a result, cost is reduced due to a reduction in hardware and microprogramming in the present invention;

(2) the control points are directly used as input data and no floating point operation is needed for the pretreatment process. The average efficiency for the four operations L, R, E, and P is better than that of Adaptive Forward Difference; and (3) the intermediate data in the present invention are control points and the property of the Bezier curve can be used, such as to determine whether the curve under detection is out of the visible window, to dynamically adapt the level of division and extension, and to screen out unnecessary computations.

Although only the preferred embodiments of this invention were shown and described in the above description, it is intended that any modification or combination that comes within the scope of this invention be protected.

What is claimed is:

1. A method of rendering a cubic curve, said method comprising:

generating a left child set and a right child set from a control point set containing four control points in a Bezier curve of the cubic curve using an LR operator, the left and right child sets each having four control points;

deriving an adjacent set and a parent set from the control point set with an EP operator using an appropriate algorithm, the adjacent and parent sets each having four control points;

displaying or outputting a line segment using first and last points of the control point set if the four control points of the control point set satisfy a predetermined convergence condition of a straight line;

terminating rendering of the Bezier curve if the Bezier curve is complete; and if the Bezier curve is not complete, returning to said generating operation for continuing a next iteration using the parent set, the adjacent set, the right child set, or the left child set to replace the control point set, wherein the adjacent set is used as the control point set for the next iteration if the four control points of both the left and right child sets fail to satisfy the predetermined convergence condition of the straight line, the parent set is used as the control point set for the next iteration if the control point set is convergent, the right child set is used as the control point set for the next iteration if the four control points of the left child set satisfy the predetermined convergence condition of the straight line and the four control points of the right child set fail to satisfy the predetermined convergence condition of the straight line and the left child set is used as the control point set for the next iteration if the four control points of the left child set fail to satisfy the predetermined convergence condition of the straight line and the four control points of the right child set satisfy the predetermined convergence condition of the straight line.

2. An apparatus for rendering a cubic curve, said apparatus comprising:

a visible window coordinate register operable to store coordinates of upper-left and lower-right locations of a visible window, the upper-left and lower-right locations serving as references for determining if a curve is visible;

an input control point register operable to store input control points;

an output control point register operable to store output control points;

an LR operator operable to generate left and right child sets from the input control points with three layers of operation by using addition and shifting;

an EP operator operable to generate adjacent and parent sets from the input control points with three layers of operation by using addition and shifting;

a path selector comprising a convergence analyzer, a visibility determining device, and a terminating counter, said path selector being operable to determine feedback inputs and outputs from the left and right child sets and the adjacent and parent sets generated by said LR and EP operators; and a segment generator operable to generate point data in a desired line using first and last control points of a Bezier curve as terminal points in accordance with a drive of a display device.

3. A method of rendering a cubic curve, said method comprising:

generating a left child set and a right child set from a control point set containing four control points in a Bezier curve of the cubic curve using an LR operator, the left and right child sets each having four control points;

deriving an adjacent set and a parent set from the control point set with an EP operator using an appropriate algorithm, the adjacent and parent sets each having four control points;

terminating rendering of the Bezier curve if the Bezier curve is complete;

if both of the left child set and the right child set have four control points that satisfy the predetermined convergence condition of the straight line, replacing the four control points of the control point set with the four control points of the adjacent set, and displaying or outputting a line segment using first and last points of the right and left child sets, and returning to said generating operation for continuing a next iteration depending on a current iteration;

if only the left child set has four control points satisfying the predetermined convergence condition of the straight line, then replacing the four control points of the control point set with the four control points of the right child set, displaying or outputting a line segment using first and last points of the left child set, and returning to said generating operation for continuing a next iteration; and if only the right child set has four control points satisfying the predetermined convergence condition of the straight line, then replacing the four control points of the control point set with the four control points of the left child set, and returning to said generating for continuing the next iteration.

4. An apparatus for rendering a cubic curve, said apparatus comprising:

a visible window coordinate register operable to store coordinates of upper-left and lower-right locations of a visible window, the upper-left and lower-right locations serving as references for determining if a curve is visible;

an input control point register operable to store input control points;

an output control point register operable to store output control points;

an LR operator operable to generate left and right child sets of control points;

an EP operator operable to generate adjacent and parent sets of control points;

a path selector including, a convergence analyzer, a visibility determining device, and a terminating counter, said path selector being operable to receive the left and right child sets, the adjacent and parent sets and the coordinates of the upper left and lower-right locations of the visible window, to determine control points to be fed back into said LR and EP operators, and to output control points to said output control point register from control points of a group consisting of the left and right child sets and the adjacent parent sets; and a segment generator operable to receive the output control points from said output control point register and to generate point data in a desired line using first and last control points of a Bezier curve as terminal points in accordance with a driver of a display device.

* * * * *